United States Patent Office 3,356,759
Patented Dec. 5, 1967

3,356,759
COMPOSITION COMPRISING A POLYPYRO-
MELLITIMIDE AND A FLUOROCARBON
RESIN
Clare W. Gerow, Buffalo, N.Y., assignor to E. I. du Pont
de Nemours and Company, Wilmington, Del., a corporation of Delaware
No Drawing. Continuation of application Ser. No.
245,652, Dec. 19, 1962. This application Nov. 29,
1966, Ser. No. 597,564
12 Claims. (Cl. 260—857)

ABSTRACT OF THE DISCLOSURE

Compositions of aromatic polypyromellitimides with 10 to 50% of a polyfluorocarbon resin, prepared by the formation of a polyamide-acid with a polyfluorocarbon followed by conversion of the polymer to a polyimide.

---

This is a continuation of my copending application, Ser. No. 245,652, filed Dec. 19, 1962, now abandoned.

This invention relates to a new bearing material and a process for making it.

There has been a need in the bearing field for a wear-resistant resin having good frictional properties, particularly a low non-lubricated static coefficient of friction. It is also important for this material to be resistant to thermal degradation, and creep-resistant under various kinds of stresses, and to have these properties at high (over 200° C.) as well as low temperatures. The compositions of this invention surpass all known bearing materials in one or more of these properties.

The compositions of this invention comprise aromatic polyimides, which are devoid of plastic flow up to at least 350° C., having dispersed through them at least 10%, by weight, preferably no more than 50% by weight, of a particulate solid of a halocarbon resin having the recurring unit

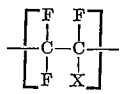

wherein X is selected from the group consisting of fluorine and chlorine. Optionally, graphite particles may be used along with the halocarbon resin particles.

Specifically, the polyimides are of organic diamines having the formula: H₂N—R'—NH₂ wherein R' is selected from the group consisting of

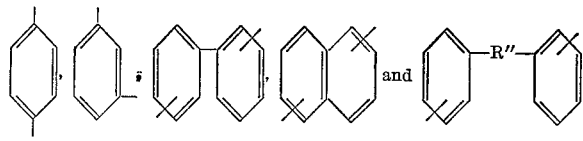

wherein R" is selected from the group consisting of oxygen, silicon in

and

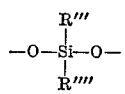

phosphorus in

and

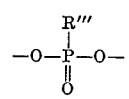

sulphur alone and in —SO₂— and nitrogen in

wherein R''' and R'''' are selected from the group consisting of alkyl and aryl; and tetracarboxylic acid dianhydrides having the formula:

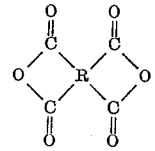

wherein R is selected from the group consisting of aromatic, aliphatic, cycloaliphatic, heterocyclic, combination of aromatic and aliphatic, and substituted groups thereof, preferably aromatic.

The halocarbon resins are exemplified by the homopolymer of tetrafluoroethylene and its copolymers with hexafluoropropylene, and by polychlorotrifluoroethylene. Also operable are modified polymers of a type known as telomers. These telomers are reaction products of halocarbon monomers with fragmentable compounds, e.g. methanol, methylcyclohexane, as described in assignee's copending application Ser. No. 108,982, filed by J. D. Brady on May 10, 1961, which disclosure is incorporated herein by reference.

The objects are accomplished by first forming a composition containing at least one polyamide-acid of the aforementioned diamines and dianhydrides having an inherent viscosity of at least 0.1, preferably 0.3–5.0, having blended therein the particles of the halocarbon resin; then shaping the particle-containing polyamide-acid composition into a structure; and, thereafter, converting the structure to a polyimide structure containing the particles.

The process may be divided into four steps:
(1) Preparing the polyamide-acid.
(2) Preparing a composition of the particle/polyamide-acid mixture.
(3) Shaping the composition into a useful structure.
(4) Converting the structure to a particle-containing polyimide structure.

Each of these steps will be discussed separately in subsequent portions of this specification.

PREPARING POLYAMIDE-ACID COMPOSITIONS

The process for preparing the polyamide-acid composition involves reacting at least one organic diamine having the structural formula H₂N—R'—NH₂ with at least one tetracarboxylic acid dianhydride having the structural formula

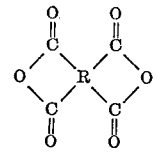

wherein R is a tetravalent radical containing at least 2 carbon atoms, no more than 2 carbonyl groups of said dianhydride attached to any one carbon atom of said tetravalent radical; in an organic solvent for at least one of the reactants, the solvent being inert to the reactants, preferably under anhydrous conditions, for a time and at a temperature sufficient to provide a shapeable composition of polyamide-acid.

It should be understood that it is not necessary that the polymeric component of the composition be composed entirely of the polyamide-acid. This is particularly true since conversion to the polyimide is contemplated subsequent to shaping the composition. To retain its shapeability, it has been found that in most instances the polymeric component of the composition should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapeable compositions. The particular temperature below 175° C. that must not be exceeded for any particular combiantion of diamine, dianhydride, solvent and reaction time to provide a reaction product composed of sufficient polyamide-acid to be shapeable will vary but can be determined by a simple test by any person of ordinary skill in the art. However, to obtain the maximum inherent viscosity, i.e. maximum degree of polymerization, for any particular combination of diamine, dianhydride, solvent, etc., and thus produce shaped articles such as film and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

$$\text{Inherent viscosity} = \frac{\text{natural logarithm} \frac{\text{viscosity of solution}}{\text{viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. For forming the composition into shaped articles, it has been found that the most successful results are obtained when the solvent represents at least 60% of the final polymeric solution. That is, the solution should contain 0.05–40% of the polymeric component.

The starting materials for forming the products of the present invention are organic diamines and tetracarboxylic acid dianhydrides. The organic diamines are characterized by the formula: $H_2N$—$R'$—$NH_2$, wherein $R'$, the divalent radical, is characterized by benzenoid unsaturation and includes

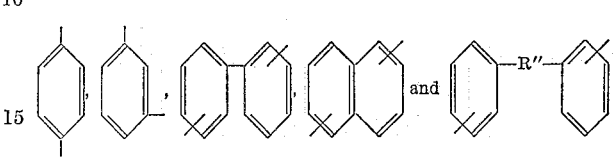

wherein $R''$ is selected from the group consisting of —O—,

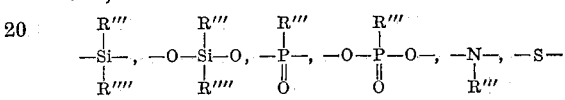

—$SO_2$— wherein $R'''$ and $R''''$ are alkyl or aryl. Among the diamines which are suitable for use in the present invention are:

metaphenylene diamine,
para-phenylene diamine,
benzidine,
4,4'-diamino-diphenyl sulfide,
4,4'-diamino-diphenyl sulfone,
3,3'-diamino-diphenyl sulfone,
4,4'-diamino-diphenyl ether,
2,6-diamino-pyridine,
bis-(4-amino-phenyl)diethyl silane,
bis-(4-amino-phenyl)diphenyl silane,
bis-(4-amino-phenyl)-N-methylamine,
1,5-diamino naphthalene,
3,3'-dimethyl-4,4'-diamino-biphenyl,
3,3'-dimethoxy benzidine,
2,4-bis(beta-amino-t-butyl)toluene,
bis-(para-beta-amino-t-butyl-phenyl)ether,
para-bis(2-methyl-4-amino-pentyl)benzene,
para-bis-(1,1-dimethyl-5-amino-pentyl)benzene,
m-xylylene diamine,
p-xylylene diamine,
3,3'-dichloro-benzidine,
bis-(4-amino-phenyl)ethyl phosphine oxide,
bis-(4-amino-phenyl)phenyl phosphine oxide,
bis-(4-amino-phenyl)-N-phenylamine, and mixtures thereof.

The tetracarboxylic acid dianhydrides are characterized by the following formula:

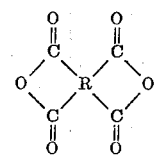

wherein R is a tetravalent organic radical selected from the group consisting of aromatic, aliphatic, cycloaliphatic, heterocyclic, combination of aromatic and aliphatic, and substituted groups thereof. However, the preferred dianhydrides are the aromatic tetracarboxylic acid dianhydrides, those in which the R groups have at least one ring of 6 carbon atoms characterized by benzenoid unsaturation (alternate double bonds in a ring structure), and particularly those aromatic dianhydrides wherein the 4 carbonyl groups of the dianhydride are each attached to separate carbon atoms in a benzene ring and wherein the carbon atoms of each pair of carbonyl groups is directly attached to adjacent carbon atoms in a benzene ring of the R group to provide a 5-membered ring as follows:

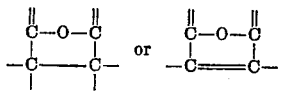

Illustrations of dianhydrides suitable for use in the present invention include:

pyromellitic dianhydride,
2,3,6,7-naphthalene tetracarboxylic dianhydride,
3,3',4,4'-diphenyl tetracarboxylic dianhydride,
1,2,5,6-naphthalene tetracarboxylic dianhydride,
2,2',3,3'-diphenyl tetracarboxylic dianhydride,
2,2-bis(3,4-dicarboxyphenyl) propane dianhydride,
bis(3,4-dicarboxyphenyl) sulfone dianhydride,
3,4,9,10-perylene tetracarboxylic dianhydride,
bis(3,4-dicarboxyphenyl) ether dianhydride,
ethylene tetracarboxylic dianhydride,
naphthalene-1,2,4,5-tetracarboxylic dianhydride,
naphthalene-1,4,5,8-tetracarboxylic dianhydride,
decahydronaphthalene-1,4,5,8-tetracarboxylic dianhydride,
4,8-dimethyl-1,2,3,5,6,7-hexahydronaphthalene-1,2,5,6-tetracarboxylic dianhydride,
2,6-dichloronaphthalene-1,4,5,8-tetracarboxylic dianhydride,
2,7-dichloronaphthelene-1,4,5,8-tetracarboxylic dianhydride,
2,3,6,7-tetrachloronaphthalene-1,4,5,8-tetracarboxylic dianhydride,
phenanthrene-1,8,9,10-tetracarboxylic dianhydride,
cyclopentane-1,2,3,4-tetracarboxylic dianhydride,
pyrrolidine-2,3,4,5-tetracarboxylic dianhydride,
pyrazine-2,3,5,6-tetracarboxylic dianhydride,
2,2-bis(2,3-dicarboxyphenyl) propane dianhydride,
1,1-bis(2,3-dicarboxyphenyl) ethane dianhydride,
1,1-bis(3,4-dicarboxyphenyl) ethane dianhydride,
bis(2,3-dicarboxyphenyl) methane dianhydride,
bis(3,4-dicarboxyphenyl) methane dianhydride,
bis(3,4-dicarboxyphenyl) sulfone dianhydride,
benzene-1,2,3,4-tetracarboxylic dianhydride,
1,2,3,4-butane tetracarboxylic dianhydride,
thiophene-2,3,4,5-tetracarboxylic dianhydride,
3,4,3',4'-benzophenone tetracarboxylic dianhydride, etc.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethyl-formamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with poor solvents such as benzene, benzonitrile, dioxane, xylene, toluene and cyclohexane.

PREPARING A COMPOSITION OF THE PARTICLE/POLYAMIDE-ACID MIXTURE

The halocarbon polymeric particles may be added at any stage in the preparation of the polyamide-acid. The particles may be added to the organic solvent prior even to the introduction of the diamine and the dianhydride. They also may be added to the solution in the organic solvent of one or both of the reactants before, during or after the formation of the polyamide-acid. Preferably, the particles are added to a solution of the polyamide-acid.

The particles may represent anywhere from 10% to 90% or more, preferably 10-50%, by weight, of the blend of particles and polymer. The use of less than 10% does not provide adequate wear resistance. The use of amounts greater than 50% has no significant beneficial effect on wear resistance.

SHAPING THE COMPOSITION INTO A USEFUL STRUCTURE

The polyamide-acid composition containing the particles dispersed therein is next shaped into a useful article. Shaping may be accomplished by extruding the solution through an appropriate orifice or slot to form filaments, rods, flat sheets, tubing or the like. Alternatively, the composition may be cast onto flat or curved surfaces to form sheets, films, etc., or placed in molds of the desirable shape. The composition may also be coated on to substrates, preferably surface-modified polyimide films.

CONVERTING THE STRUCTURE OR ARTICLE TO A PARTICLE-CONTAINING POLYAMIDE ARTICLE

The shaped articles composed of a substantial amount of the polyamide-acid and halocarbon polymer particles are converted to the respective polyimide shaped articles by any one or more of several processes. One process comprises converting the polyamide-acid units of the following structural formula:

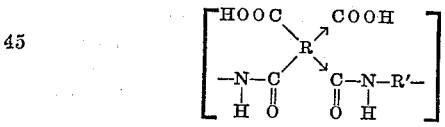

wherein → denotes isomerism, to polyimide by heating above 50° C. Heating serves to convert pairs of amide and carboxylic acid groups to imide groups. Heating may be conducted for a period of a few seconds to several hours. It has been found that after the polyamide-acid has been converted to the polyimide in accordance with the above described heat conversion, if the polyimide is further heated to a temperature of 300°–500° C. for a short interval (15 seconds to 2 minutes), improvements in the thermal and hydrolytic stabilities of the polyimide structure are obtained as well as an increase in inherent viscosity.

A second process for converting polyamide-acid to the corresponding polyimide is a chemical treatment and involves treating the polyamide-acid composition with a dehydrating agent alone or in combination with a tertiary amine, e.g. acetic anhydride or an acetic anhydride-pyridine mixture. The polyamide-acid shaped article can be treated in a bath containing the acetic anhydride-pyridine mixture. The ratio of acetic anhydride to pyridine may vary from just above zero to infinite mixtures. It is believed that the pyridine functions as a catalyst for the action of the cyclizing agent, the acetic anhydride. The amine functions as a catalyst for the action of the cyclizing agent, the anhydride.

Besides acetic anhydride, lower fatty acid anhydrides and aromatic monobasic acid anhydrides can be used. The lower fatty acid anhydrides include propionic, butyric, valeric, mixed anhydrides of these with one another and with anhydrides of aromatic monocarboxylic acids, e.g. benzoic acid, naphthoic acid, etc., and with anhydrides of carbonic and formic acids, as well as aliphatic ketenes (ketene and dimethyl ketene). The preferred fatty acid anhydrides are acetic anhydride and ketene. Ketenes are regarded as anhydrides of carboxylic acids, (ref. Bernthsen-Sudborough, textbook of Organic Chemistry, Van Nostrand, 1935, p. 861 and Hackh's Chemical Dictionary, Blakiston, 1953, p. 468) derived from drastic dehydration of the acids.

The aromatic monobasic acid anhydrides include the anhydride of benzoic acid and those of the following acids: o-, m- and p-toluic acids; m- and p-ethyl benzoic acids; p-propyl benzoic acid; p-isopropyl benzoic acid; anisic acid; o-, m- and p-nitro benzoic acids; o-, m- and p-halo benzoic acids; the various dibromo and dichloro benzoic acids; the tribromo and trichloro benzoic acids; isomeric dimethyl benzoic acids, e.g. hemellitic, 3,4-xylic, isoxylic and mesitylenic acids; veratric acid; trimethoxy benzoic acid; alpha- and beta-naphthoic acids; and biphenylcarboxylic (i.e. p-phenyl benzoic) acid; mixed anhydrides of the foregoing with one another and with anhydrides of aliphatic monocarboxylic acids, e.g. acetic acid, propionic acid, etc., and with anhydrides of carbonic and formic acids.

Tertiary amines having approximately the same activity as the preferred pyridine may be used in the process. These include isoquinoline, 3,4-lutidine, 3,5-lutidine, 4-methyl pyridine, 3-methyl pyridine, 4-isopropyl pyridine, N-dimethyl benzyl amine, 4-benzyl pyridine, and N-dimethyl dodecyl amine. These amines are generally used from 0.3 to equimolar amounts with that of the anhydride converting agent. Trimethyl amine and triethylene diamines are much more reactive, and therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N-dimethyl cyclohexylamine, 4-benzoyl pyridine, 2,4-lutidine, 2,6-lutidine and 2,4,6-collidine, and are generally used in larger amounts.

As a third process of conversion, a combination treatment may be used. The polyamide-acid may be partially converted to the polyimide in a chemical conversion treatment and then cyclization to the polyimide may be completed by subsequent heat treatment. The conversion of the polyamide-acid to the polyimide in the first step can be limited if it is desired to shape the composition at this stage. After shaping, the completion of the cyclization of the polyimide/polyamide-acid may be accomplished.

The presence of polyimide is evidenced by its insolubility in cold basic reagents as opposed to the rapid solubility of polyamide-acid. Its presence is also apparent if the polyamide-acids are scanned with infrared during conversion to the polyimide. The spectra initially show a predominating absorption band at ca. 3.1 microns due to the NH bond. This band gradually disappears and as the reaction progresses, the polyimide absorption bands appear, a doublet at ca. 5.64 and 5.89 microns and a peak at 13.85 microns. When conversion is completed, the characteristic polyimide band predominates.

The bearing materials of this invention are unaffected by exposure to virtually any solvent or corrosive chemical except aqueous alkaline hydroxides and acids. They can withstand exposure at temperatures of 300° C. and higher. They have low starting friction, which is important in some bearing applications and often results in considerable cost savings. In contrast to metal bearings, the coefficient of friction decreases with increase in load and, at high loads, with increase in temperature. Also in contrast to metal bearings, friction drops with reduction of speed. This is very important under some high load/low speed conditions.

The low thermal conductivity of the materials of this invention makes it preferable to fabricate them as thin as practical, in order to promote heat transfer. This permits more compact design and reduced cost.

The excellent thermal and wear resistance of these polyimide materials is particularly important when the bearing is to be confined in a rigid housing with very little clearance. The combined effect of generated heat and of the pressure from thermal expansion can become very severe. The filled compositions of this invention are unaltered by moisture, and so do not deteriorate or change dimensions with variations in moisture. Finally they serve well under non-lubricated conditions. Their PV limits are higher than those of the best known polymeric non-lubricated bearings.

The properties of the filled compositions of this invention make them useful in the following situations:

(1) With non-lubricating liquids such as gasoline and industrial solvents.

(2) With many corrosive substances.

(3) At elevated temperatures (to 500° F. or higher) where common lubricants degrade or vaporize.

(4) In low-humidity service where other types of dry bearings cannot be used.

(5) At high-humidity locations where there is a tendency for environmental attack.

(6) For heavy-load, slow-speed duty that tends to squeeze oil out of ordinary bearing surfaces.

(7) In areas where there is danger of fretting.

(8) For lubricated applications in which wear may occur immediately after each start from rest.

(9) In applications where slip-stick motion is harmful, or where it is the cause of undesirable vibration and noise.

(10) When lowest possible static friction is desirable— e.g. reciprocating or oscillating systems.

(11) In locales that are inaccessible or liable to be overlooked during lubrication.

(12) In applications where weight savings are essential.

(13) In areas where the use of oil would attract abrasive dust.

(14) Where lack of lubrication might result in costly interruption of production, or extensive damage to equipment.

Good abrasion-resistance makes these materials useful for conveyors and industrial belts. They also can be used for release sheets where anti-stick properties are important.

The invention will be more clearly understood by referring to the examples which follow. These examples, which illustrate specific embodiments of the present invention, should not be construed to limit the invention in any way.

*Example 1*

To a 15 wt. percent solution of the polyamide-acid of pyromellitic dianhydride and 4,4'-diaminodiphenyl ether in dimethylacetamide is added sufficient "Teflon" (Du Pont trademark), TFE polytetrafluoroethylene extrusion powder to give a 10% dispersion (based on the polyamide-acid). After intimate mixing, the mixture is cast into a film on a glass plate by means of a doctor knife. This plate is placed in a tray containing equal volumes of acetic anhydride and pyridine at room temperature to convert the polyamide-acid into polyimide.

A tube of this polyimide film exhibits considerably less weight loss in a conventional sleeve-bearing wear test than an unfilled polyimide film. It also has a much higher limiting PV value than the unfilled polyimide.

The limiting PV is determined as follows: a cylindrical bearing sample (generally 1 x 1 in. with a 0.01 in. wall) is installed in an anti-friction bearing mounted within a holder equipped with a torque arm. Loads up to 3,000 lb. are applied through the anti-friction bearing to the test bearing. The test shaft can be rotated at surface velocities ranging from 10 to 2,000 ft./min. During a test, the load (p.s.i.), velocity (ft./min.), friction torque (lb.-ft) and temperature (° F., 0.125 in. from rubbing surfaces) are continuously monitored.

At each velocity, a load-stepping test is conducted. Friction torque and bearing temperature, which are plotted continuously, are allowed to reach equilibrium at each loading. The equilibrium condition is maintained for about 30 min. before the load is increased.

At an advanced load increment, the friction torque and/or temperature will not stabilize; the slopes of the corresponding test curves go up sharply until the tests are terminated at bearing failure. The PV at the highest load plateau at which equilibrium occurs is reported as the "limiting PV" for the particular material being tested at that velocity.

*Example 2*

A polyimide film containing 50% by weight of polytetrafluoroethylene powder is made by the procedure of Example 1. Although it is less stiff and has lower tensile strength than the product of Example 1, it has excellent frictional, PV and wear properties, making it very useful as a bearing material.

*Example 3*

Example 1 is repeated, adding 3% by weight of graphite (based on the polyamide-acid) and 10% by weight of "Teflon" FEP perfluorocarbon resin, a powdered copolymer of tetrafluoroethylene and hexafluoropropylene, instead of polytetrafluoroethylene The product has wear properties comparable to those of the product of Example 1, a satisfactory coefficient of friction at loads over 2,000 lbs., and an unusually low static coefficient of friction. The PV limit of this product is somewhat lower than that of the Example 1 product, but still quite useful for many bearing applications.

*Example 4*

When Example 1 is repeated, using 10% by weight (based on polyamide-acid) 85:15 and 75:25 mixtures of polytetrafluoroethylene powder and graphite as the fillers, both films exhibit wear rates which are less than 10% of the wear rate of unfilled polyimide film. The test involves use of the film as a sleeve-bearing on a 303 stainless steel shaft, ½ in. long and ¼ in. in diameter, which is rotated at 100 f.p.m. under a 35 p.s.i. load.

*Example 5*

When 25% of the polytetrafluoroethylene in Example 2 is replaced by graphite (giving a filler composition of 75% polytetrafluoroethylene to 25% graphite), the resulting film exhibits greatly reduced deformation when subjected to a stationary load of 2,000 p.s.i. for 24 hours.

*Example 6*

To 10,027 g. of a 13 wt. percent solution of polyamide-acid made from pyromellitic dianhydride and 4,4'-diaminodiphenyl ether, 167 g. of graphite and 167 g. of polytetrafluoroethylene resin were added. The mixture was stirred for 70 minutes to give an intimate mixture. This mixture was cast onto a moving "Mylar" (Du Pont trademark), polyester film belt, by means of a doctor knife, under the surface of a 50/50 mixture (by volume) of acetic anhydride and pyridine to convert the polyamide-acid to the polyimide. This gel film was stored in benzene for 20 hours and was then dried under radiant heaters to give a roll of polyimide film containing 10 wt. percent graphite and 10 wt. percent polytetrafluoroethylene resin. This product has a wear constant of about 25, as compared to about 100 for two controls of the same polyimide, one containing no filler and the other containing 5 wt. percent of graphite and 5 wt. percent of polytetrafluoroethylene resin.

A product with similar wear resistance under high speed conditions is obtained by repeating the same procedure, using 20 wt. percent each of graphite and polychlorotrifluoroethylene resin.

*Example 7*

To 1,017 g. of a solution of polyamide acid (prepared from 156.42 g. of pyromellitic dianhydride and 143.58 g. of 4,4'-diaminodiphenyl ether in 2,580 ml. of dimethylacetamide) containing 101.7 g. of solids, there was added 49.7 g. of a methylcyclohexane telomer of tetrafluoroethylene.

The telomer had a number average molecular weight of 3,500, a crystalline melting point of 298° C. and contained approximately 1.1% by weight chlorine and 0.4% by weight hydrogen. The telomer had been prepared by reacting tetrafluoroethylene with methylcyclohexane in the presence of di-tert-butyl peroxide in trichlorotrifluoroethane solvent as described in Example 1 of the Brady patent application Ser. No. 108,982, filed May 10, 1961. The mixture was then stirred for one hour to give a uniform dispersion of the telomer. To 247.2 g. of this dispersion, there was added 33 ml. of acetic anhydride and this was stirred to give a uniform mixture. Then there was added 7.2 ml. of pyridine followed by stirring to thoroughly mix the ingredients. This mixture was then cast onto a glass plate by means of a doctor knife and after about 10 minutes the cast film gelled to a self-supporting film which contained the telomer evenly dispersed. This gel film was attached to a frame to restrain shrinkage and was then placed in an oven and heated to 300° C. After one hour at 300° C. the film was removed from the frame to yield a polyimide film containing the telomer evenly dispersed. This film was tough and had a surface with improved slip characteristics.

A sample of the above film was tested for use as a non-lubricated bearing material and was found to have a wear rate lower than the best commercially available bearing material (14 mg. weight loss per 50 hour on a wear test). Tests also indicate that even though the coefficient of friction of the telomer-loaded polyimide film is higher than some other commercially available bearing materials, this coefficient is maintained during use while that of other materials rises substantially before failure.

What is claimed is:

1. A process which comprises mixing at least one diamine having the formula $H_2N-R'-NH_2$ wherein R' is selected from the group consisting of

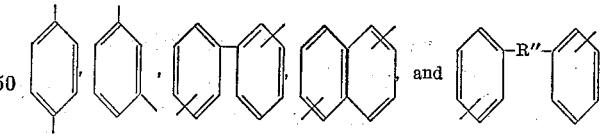

wherein R" is selected from the group consisting of

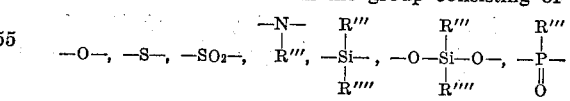

and

wherein R''' and R'''' are each selected from the group consisting of alkyl and aryl, with at least one tetracarboxylic acid dianhydride in a solvent for at least one of said diamine and said dianhydride under conditions to form a polyamide-acid; adding, in an amount sufficient to provide 10 to 50 weight percent thereof, particles of a halocarbon resin having the recurring unit

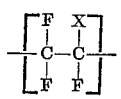

wherein X is selected from the group consisting of chlorine and fluorine to form a shapeable polymeric composition having said particles dispersed uniformly therein; shaping said composition into a shaped article; and converting the polymer in said polymeric composition to polyimide.

2. A process as in claim 1 wherein said diamine is 4,4'''-diamino-diphenyl ether, said dianhydride is pyromellitic dianhydride and said solvent is dimethylacetamide.

3. A process as in claim 1 wherein the polymer in said shaped article is converted to polyimide by heating said article.

4. A process as in claim 1 wherein the polymer in said shaped article is converted to polyimide by treating said article with an anhydride selected from the group consisting of lower fatty acid anhydrides and aromatic monobasic acid anhydrides.

5. A resinous material comprising a polyamide-acid of a diamine having the formula H$_2$N—R'—NH$_2$ wherein R' is selected from the group consisting of

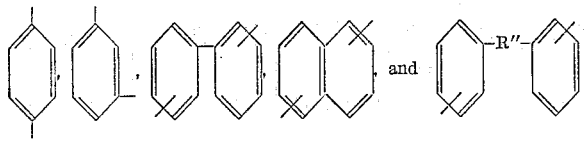

wherein R' is selected from the group consisting of

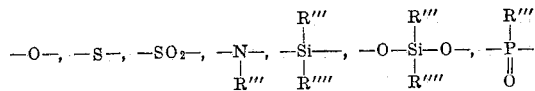

and

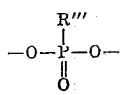

wherein R''' and R'''' are each selected from the group consisting of alkyl and aryl, and at least one tetracarboxylic acid dianhydride, said polyamide-acid having, in an amount sufficient to provide 10 to 50 weight percent thereof, particles of halocarbon resin having the recurring unit

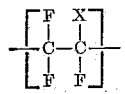

wherein X is selected from the group consisting of chlorine and fluorine distributed through it.

6. The resinous material of claim 5 in the form of a film, wherein said polyamide-acid is a polyamide-acid of pyromellitic dianhydride and 4,4'-diamino-diphenyl ether.

7. A resinous material comprising a polyimide of a diamine having the formula H$_2$N—R'—NH$_2$ wherein R' is selected from the group consisting of

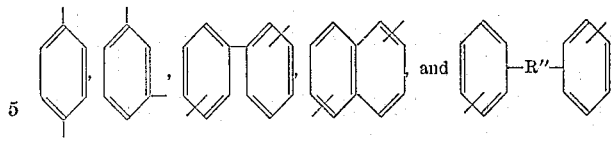

wherein R'' is selected from the group consisting of

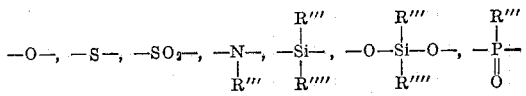

and

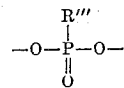

wherein R''' and R'''' are each selected from the group consisting of alkyl and aryl with at least one tetracarboxylic acid dianhydride, said polyimide having, in an amount sufficient to provide 10 to 50 weight percent thereof, particles of halocarbon resin having the recurring unit

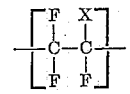

wherein X is selected from the group consisting of chlorine and fluorine distributed through it.

8. A resinous material as in claim 7 wherein said halocarbon resin particles are polytetrafluoroethylene particles.

9. A resinous material as in claim 7 wherein said halocarbon resin particles are polychlorotrifluoroethylene particles.

10. A resinous material as in claim 7 wherein said halocarbon resin particles are particles of a copolymer of tetrafluoroethylene and hexafluoropropylene.

11. A resinous material as in claim 7 wherein said halocarbon resin particles are particles of a methylcyclohexane telomer of tetrafluoroethylene.

12. A resinous material as in claim 7 in the form of a film, wherein said polyimide is a polyimide of pyromellitic dianhydride and 4,4'-diamino-diphenyl ether.

References Cited

UNITED STATES PATENTS

| 2,994,993 | 7/1960 | Brebner et al. | 260—78 |
| 3,005,795 | 10/1961 | Busse et al. | 260—857 |

FOREIGN PATENTS

| 903,271 | 8/1962 | Great Britain. |

SAMUEL H. BLECH, *Primary Examiner.*

PAUL LIEBERMAN, *Assistant Examiner.*